United States Patent
Galbrun

(12) 
(10) Patent No.: US 6,426,981 B1
(45) Date of Patent: Jul. 30, 2002

(54) PROCESS AND DEVICE FOR DECODING A RADIO FREQUENCY TRANSMISSION CHANNEL, ESPECIALLY FOR A TERRESTRIAL DIGITAL BROADCAST USING OFDM MODULATION

(75) Inventor: Jacques Galbrun, Theys (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/264,916

(22) Filed: Mar. 9, 1999

(30) Foreign Application Priority Data

Mar. 10, 1998 (FR) .............................. 98 02894

(51) Int. Cl.[7] .................. H03D 1/00; H03D 1/24; H04L 5/12
(52) U.S. Cl. .................. 375/341; 375/261; 375/320
(58) Field of Search .................. 375/341, 316, 375/261, 262, 265, 320; 714/794, 795, 786, 784, 780

(56) References Cited

U.S. PATENT DOCUMENTS

| 5,278,871 A |   | 1/1994 | Rasky et al. ................ 575/343 |
| 5,398,260 A | * | 3/1995 | Min ........................... 375/286 |
| 5,574,751 A |   | 11/1996 | Trelewicz ................... 375/265 |
| 5,896,405 A | * | 4/1999 | Moon ......................... 375/286 |
| 6,353,640 B1 | * | 3/2002 | Hessel et al. ................ 375/262 |

FOREIGN PATENT DOCUMENTS

| EP | 0 577 212 A1 | 6/1993 | ........... H04L/25/30 |
| EP | 0 772 328 A1 | 10/1996 | ......... H04L/27/233 |
| EP | 0 772 329 A1 | 10/1996 | ........... H04L/27/26 |
| FR | 2 690 797 | 3/1993 | ........... H03M/13/00 |

OTHER PUBLICATIONS

Mignone et al., A New Channel Estimation Method to Improve the Spectrum Effeciency in Digital Terrestrial Television Systems, Sep. 14–18, 1995, pp. 122–128.

* cited by examiner

Primary Examiner—Chi Pham
Assistant Examiner—Khai Tran
(74) Attorney, Agent, or Firm—Lisa K. Jorgenson; Allen, Dyer, Doppelt, Milbrath & Gilchrist, P.A.

(57) ABSTRACT

The soft decisions associated with the quadrature digital signals received are calculated on the basis of at least one parametric law slaved to the minimum value of the rate of erroneous bits. The value is determined at the output of a Viterbi decoder in a microcontroller by varying the parameter of the law. The approach may be applied to applications including terrestrial digital broadcasting according to the DVB-T standard using OFDM modulation.

22 Claims, 4 Drawing Sheets

PROCESS AND DEVICE FOR DECODING A RADIO FREQUENCY TRANSMISSION CHANNEL, ESPECIALLY FOR A TERRESTRIAL DIGITAL BROADCAST USING OFDM MODULATION

FIELD OF THE INVENTION

The invention relates to radio communication, and, more particularly, to the decoding of a radio frequency transmission channel conveying, by quadrature modulation of at least one carrier, coded digital information.

BACKGROUND OF THE INVENTION

Terrestrial digital broadcasting, such as defined in the European DVB-T (Digital Video Broadcasting-terrestrial) specification, is based on the MPEG-2 compression standard. In addition, mobile or portable terrestrial transmission may use digital quadrature modulation on a large number of "orthogonal" carriers (OFDM modulation: "orthogonal Frequency Division Multiplexing"). After a first coding phase, commonly referred to as source coding by those skilled in the art, the digital signals to be transmitted are transformed into a succession of packets of a certain number of bytes. The number of bytes is typically 188 bytes in the DVB-T specification based on the MPEG-2 compression standard which are intended to be transmitted by a radio frequency pathway or channel to a receiver. However, radio frequency transmission channels are generally corrupted with errors because of disturbances which effect the useful signal transmitted, such as, for example noise, interference, echo.

It is therefore necessary, before performing the modulation of the carrier or carriers by the signal, to perform a specific coding processing, commonly referred to as channel coding. This allows the detection and correction in the receiver of most of the errors caused by the radio frequency transmission channel.

This channel coding generally includes re-introducing a calculated redundancy into the signal, generally by using algebraic and/or convolutional error codes. In transmissions which meet the DVB-T specification, so-called Reed-Solomon external coding is used. This may be followed, in particular, by an internal coding or convolutional coding which is better known as Viterbi coding by those skilled in the art.

On exiting the channel coding phase a stream of digital data (symbols) is available. These symbols will be used to modulate one or more (in the case of OFDM modulation) carriers with a view to transmission to the receiver.

Instead of using simple digital modulation, modulating the carrier directly either in terms of amplitude or in terms of frequency by the serial bit train representing the information transported, so-called quadrature modulation is generally used which is more effective under given conditions of signal/noise ratio. Thus, for quadrature modulation the input symbols, coded over n bits, are converted into two signals I and Q each coded over n/2 bits, thus yielding $2^n/2$ states for each of the signals I and Q. The signals I and Q then quadrature-modulate one or more carriers. This results in a constellation of points in the space (I, Q), these corresponding to the various values which the signals I and Q may take.

OFDM modulation includes quadrature-modulating, not a single carrier, but a number N of carriers, typically 2048 or 8192, respectively 2K or 8K depending on the application, by symbols of duration $T_s$. The frequency difference between two consecutive carriers is $1/T_s$. OFDM modulation has the advantage of exhibiting very good behavior in the case of multipath reception. Multipath effects are frequent during terrestrial reception, fixed or mobile, if the delay of the multiple paths remains less than the time separating two OFDM symbols (the guard interval).

On receiving the radio signal, after UHF demodulation and digitization, a demodulation processing is performed. The demodulation comprises, in the case of OFDM modulation, an N-point fast Fourier transform processing so as to extract each carrier, as well as a determination of phase in a phase-locked loop, to retrieve digital signals representative of the transmitted signals coded as I and Q. These digital signals will then undergo a first decoding phase, termed channel decoding, followed by a second decoding phase termed source decoding, so as to obtain the initial digital information at the end of the chain.

One of the steps of the channel decoding includes, for each signal pair I and Q received, determining the digital words transmitted (2 bits for quadrature modulation of the QPSK type, 4 bits for quadrature modulation of the 16QAM type, 6 bits for quadrature modulation of the 64QAM type) and consequently the code word associated with the corresponding point of the constellation and representative of the corresponding coded information received. This determination is also accompanied by the determination of a confidence word, or more simply "confidence criterion" or "soft decision", assigned to the code word. The code word thus determined, assigned by its confidence criterion, will then be used in the remainder of the channel decoding, especially in a convolutional Viterbi decoder.

The confidence criteria associated with the code words makes it possible, for each code word, to afford a greater or lesser guarantee as to the accuracy of the value determined for this code word. Currently, the various confidence criteria are stored in a memory table and chosen as a function of the incoming pair I,Q. The table is precalculated on the basis of a unique law whose threshold values are predetermined.

Moreover, the various stored values of the confidence criteria have been preestablished for a certain type of transmission channel exhibiting predefined characteristics in terms in particular of noise or echo. This leads, upon a modification of the characteristics of the transmission channel, such as, in mobile television applications, to unsuitable choices of the "code word/confidence criterion" pair, and consequently, to an increase in the rate of erroneous bits on completion of the channel decoding.

SUMMARY OF THE INVENTION

In view of the foregoing background, the present invention seeks to reduce the rate of erroneous bits during the decoding of a radio frequency reception of channels, using OFDM modulation in particular.

It has been observed, through measurements, that the decoding step which maps each carrier to the code word of the constellation is sensitive to the type of route traversed by the transmission signal. The decoding process according to the invention makes it possible to adapt this step of the decoding to the type of reception channel.

The invention therefore proposes a process for decoding a radio frequency transmission channel conveying, by quadrature modulation of at least one carrier, coded digital information. In the process a succession of digital input blocks is received, each comprising two digital input words (I and Q) representative of the value of the coded information, and a code word (formed of two digital words hereinafter denoted XI and XQ of j bits each, with j=1 for QPSK, j=2 for 16QAM and j=3 for 64QAM). The confidence is determined from each pair of input words and from a mapping law.

According to a general characteristic of the invention, at least one mapping rule or law is derived which can be parametrized by at least one parameter. This makes it possible, for each value of the parameter, to determine the corresponding confidence word for each of the two digital input words. The mapping law can make it possible to derive the confidence words directly. However, when the input blocks comprise, apart from the words I and Q, an initial confidence word emanating from the demodulator, it is particularly advantageous to multiply this initial confidence criterion by the confidence criterion derived by the law so as to obtain the digital confidence word associated with the code word.

The value of the parameter is varied and for each current value of the parameter and for a predetermined number of bits received, a rate of erroneous bits is determined corresponding to this current value. Those values having given rise to a minimum rate of erroneous bits are selected from among all the current values of the parameter, and the selected current value is assigned to the parameter for the remainder of the channel decoding. The remainder of the channel decoding being the determination of the code words and of the confidence criteria corresponding to the latest digital input words.

Stated in other words, the invention provides for the measurement of the rate of erroneous bits and uses this measurement to slave the parametric derivation law making it possible to obtain the various confidence criteria. The invention therefore has the advantage of allowing optimal adaptation of the receiver with regard to the error rate, and irrespective of the characteristics of the transmission channel. This is particularly beneficial in mobile television applications. The invention also has the advantage, for a television receiver located in a room, of automatically and optimally adapting the channel decoding device as a function of the reception conditions of the receiver.

When the coding of the coded digital information comprises convolutional coding, for example, a Viterbi coding, the determination of the rate of erroneous bits comprises a convolutional decoding of the train of bits formed by base words gleaned from the code words. In practice these base words can be obtained after deinterlacing and decompressing the code words in such a way as to obtain the decoded words train of decoded bits. Then a convolutional re-encoding of the decoded words is performed. A comparison is made between, on the one hand, the train of re-encoded bits formed by the re-encoded words, and, on the other hand, the train of bits formed by the corresponding base words.

According to one mode of implementation of the process, a predetermined set of values of the parameter can be derived. The value of the parameter is then varied by assigning it all the values of the set successively. The value having led to the minimum rate of erroneous bits will then be selected. The mapping law can comprise a threshold parametric affine law, which is identical or different for each of the two signals I and Q.

The objective of the invention is also a device for decoding a radio frequency transmission channel conveying, by quadrature modulation of at least one carrier, coded digital information. This device comprises an input for receiving a succession of digital input blocks each comprising two digital input words (I and Q) representative of the value of the coded information transmitted. The device also includes preprocessing means able, on the basis of each pair of input words and a mapping law, to determine a code word (X1, XQ) as well as a confidence word. According to a general characteristic of the invention, the preprocessing means comprise a discriminator able to deliver, for each of the two digital input words, the code word, as well as derivation means possessing a parametrizing input for receiving at least one variable parameter. These derivation means are able to establish at least one parametric mapping law, by means of at least the parameter, and to deliver as a function of the derived mapping law, and for each of the two digital input words of each pair, the corresponding confidence word.

The device moreover comprises detection means connected to the output of the preprocessing means and able to detect any erroneous bit. Processing means are connected between the output of the detection means and the input of the derivation means. The processing means are able to vary the parameter value delivered to the derivation means, to determine, from the number of erroneous bits detected for one and the same current value of the parameter and for a predetermined number of bits received, a rate of erroneous bits corresponding to this current value. The processing means selects those values having given rise to a minimum rate of erroneous bits from among all the current values of the parameter, and delivers to the derivation means the selected current value for the remainder of the channel decoding.

According to one embodiment of the invention in which the coding of the digital information comprises a convolutional coding, the detection means comprise a convolutional decoder whose input is linked to the output of the preprocessing means. The detection means also includes a convolutional coder whose input is linked to the output of the convolutional decoder and comparison means whose inputs are respectively linked to the input of the convolutional decoder and to the output of the convolutional coder. The output of the comparison means is connected to the input of the processing means.

BRIEF DESCRIPTION OF THE DRAWING

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
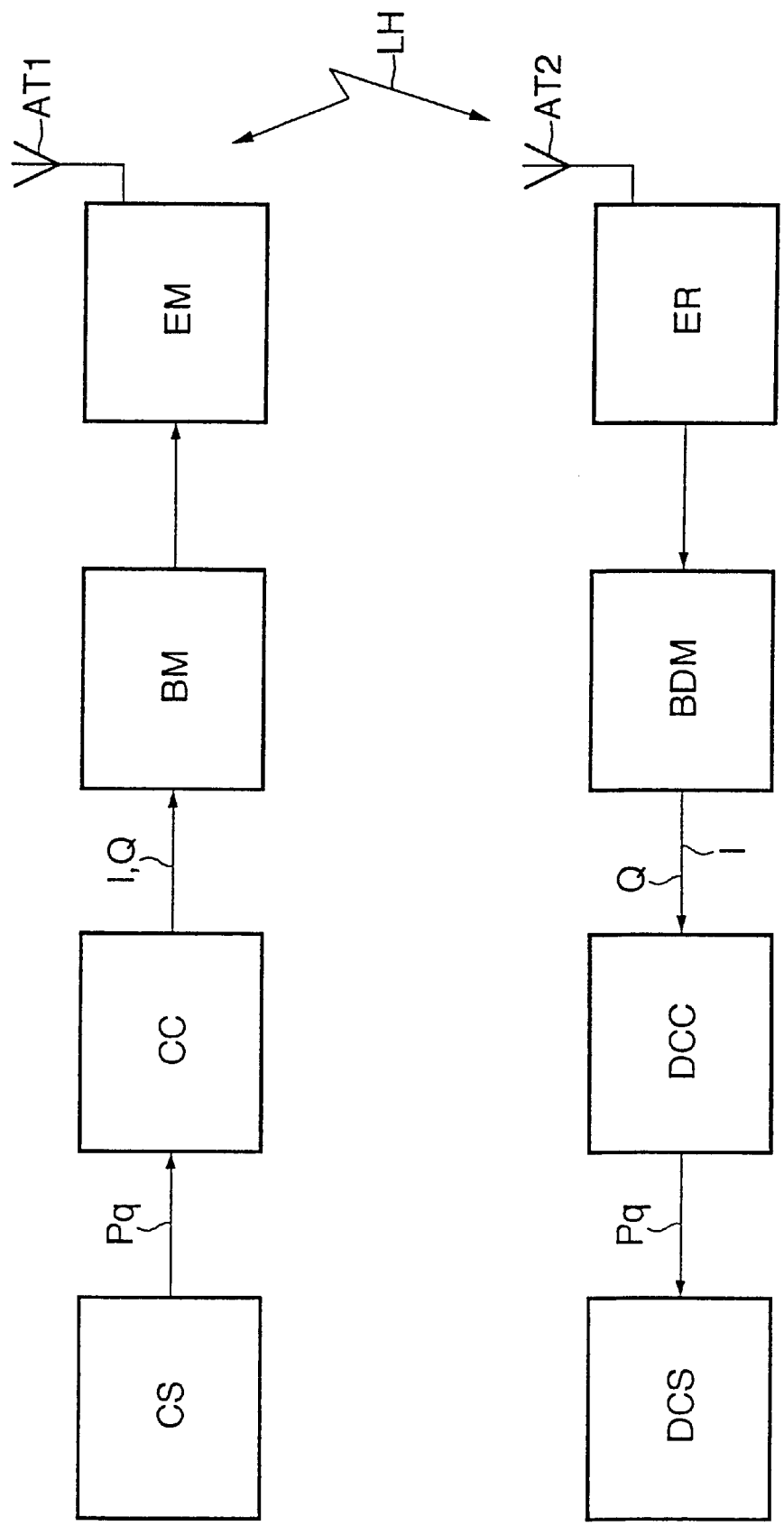
FIG. 1 illustrates very schematically a system for transmitting and receiving a digital signal transmitted via a radio link and incorporating a channel decoding device according to the invention.

In FIG. 1, the reference CS designates a source coding device conforming, for example, to the MPEG-2 standard, of construction known by those skilled in the art. The source coding device receives as inputs video and audio signals from the programs to be transmitted and delivers, after coding conforming to the MPEG-2 standard and then multiplexing and scrambling, packets termed "transport packets", of 188 bytes. These packets Pq are delivered to a channel coding device CC intended to introduce a redundancy into the signal, thereby making it possible to detect and correct the errors of the transmission channel.

This device CC generally comprises, in the conventional manner, a Reed-Solomon coder followed, in the case of a transmission conforming to the DVB-T specification, by a second coding block intended to perform an additional coding, termed internal or convolutional coding. This second coding block comprises in the conventional manner a convolutional coder, commonly referred to as a Viterbi coder by those skilled in the art. This is followed, for the case of terrestrial transmissions under OFDM modulation, by an internal interlacing device and by a compression device carrying out a so-called "compression" operation on the output bit trains, thereby diminishing the large redundancy introduced by the Viterbi code.

Convolutional or Viterbi coding is fully known to those skilled in the art and has formed the subject of a sizeable bibliography. In brief, such a convolutional coder can be represented by a shift register of (m+1)k stages receiving blocks of k symbols, and combinatorial logic circuits outputting blocks of s symbols. The s output bits do not depend only on the block of k bits but also on the previous m blocks. Stated in slightly different terms, the convolutional coder transforms the incoming binary train into s outgoing binary trains which are correspondingly many combinations of sums (modulo 2) among the input train and the outputs of each stage of the shift register, to whose input the train is likewise applied (the train progresses by one stage with each new bit applied to the input). On the output from the device CC, words of twice n/2 bits (words I and Q) corresponding to symbols coded over n bits are delivered to a modulation block BM.

Figure 2:
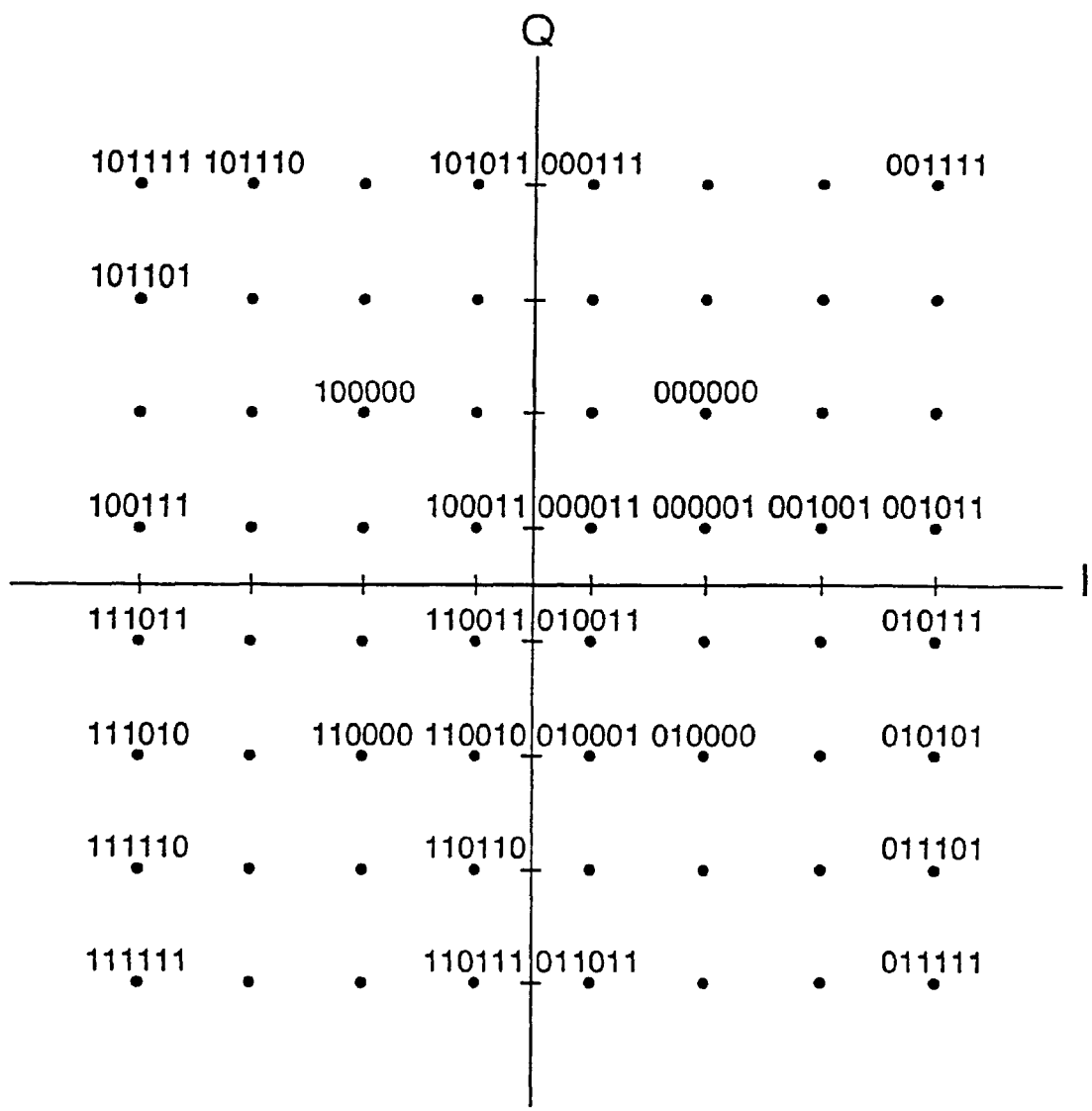
FIG. 2 illustrates a constellation of points in a quadrature modulation of the 64-QAM type.

In the case of 64-state quadrature amplitude modulation, that is to say with 6 bits per symbol (so-called 64-QAM modulation), the constellation of points illustrated in FIG. 2 is obtained. To each of the 64 symbols coded over 6 bits there correspond two words I and Q of 3 bits having a predetermined value.

In the case of OFDM modulation, N carriers (N being equal to 2048 or 8192 depending on the applications) are modulated by the symbols coded over n bits. The frequency difference between two consecutive carriers is equal to $1/T_s$, where $T_s$ is equal to the duration of a symbol. More precisely, the frequency $F_k$ of a carrier of rank k is equal to $F_o+k/T_s$ where $F_o$ is the frequency of the lowest carrier.

After various conventional processing operations performed in a transmission stage EM associated with an antenna AT1, the modulated signal is transmitted within a radio signal LH towards a receiver equipped with an antenna AT2 and with a receiving stage ER. After conventional reception processing operations within the stage ER and after analog/digital conversion, the modulated signal is demodulated in a demodulation block BDM. The demodulation block BDM comprises, for example, in the case of OFDM modulation, N-point fast Fourier transform processing operations, as well as phase decoding processing based on phase-locked loops. For each coded symbol received, the output of the demodulation block BDM delivers two corresponding digital words I and Q which are input to a channel decoding device DCC according to the invention. The channel device DCC outputs the packets Pq which will be decoded in the conventional manner in a source decoding device DCS in accordance with the MPG-2 standard so as to re-output the initial audio and video signals.

Figure 3:
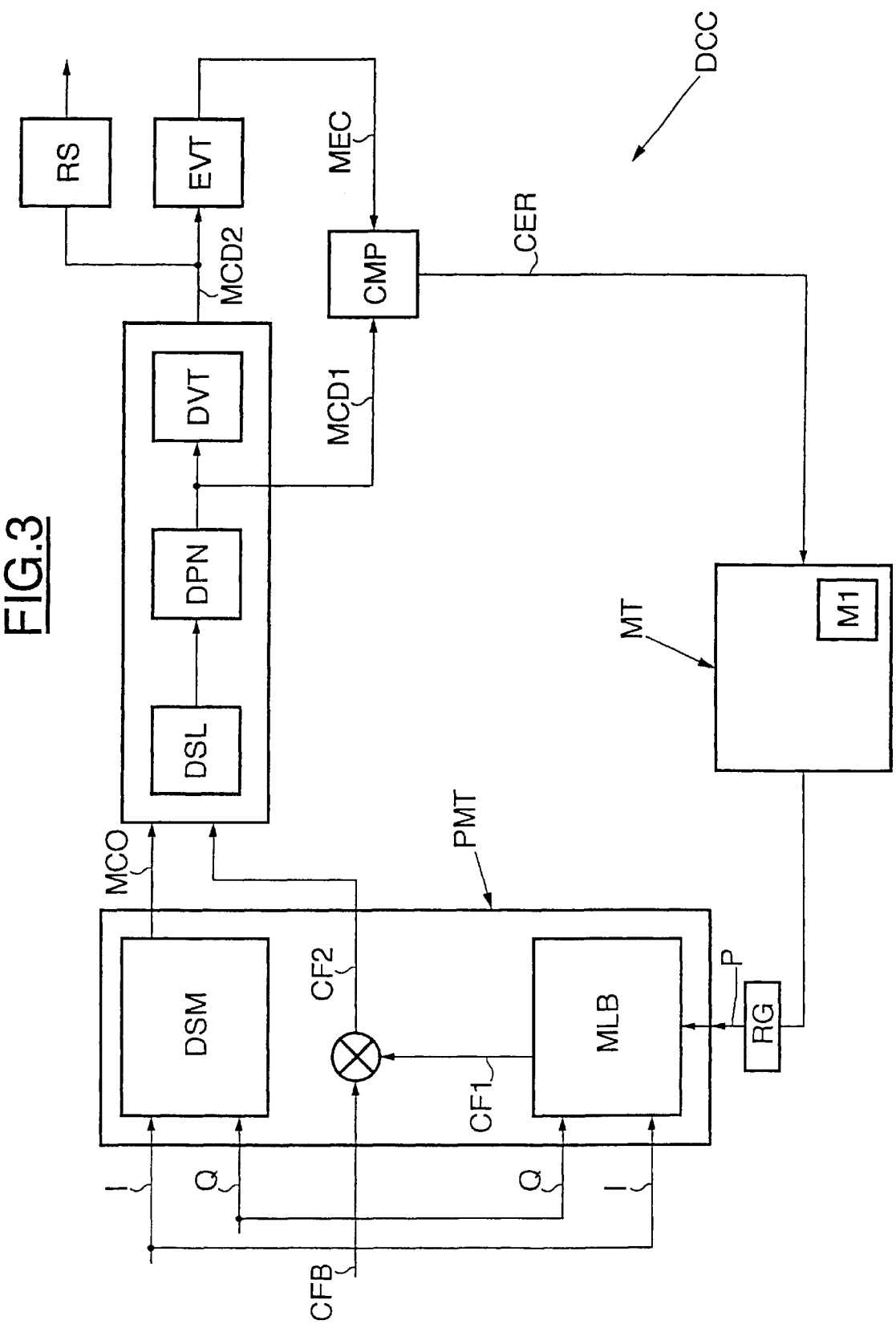
FIG. 3 is a schematic overview of the internal architecture of a decoding device according to the invention.

Referring now more particularly to FIG. 3, it may be seen that a decoding device DCC according to the invention comprises preprocessing means PMT. The preprocessing means or block PMT derive, on the basis on the one hand of successive digital blocks, respectively, comprising the input words I and Q (on 8 bits), as well as an initial confidence word CFB (on 4 bits) which emanates from the demodulation block, and on the other hand of at least one parameter P, successive code words MCO respectively assigned confidence words CF2. In the case of quadrature modulation of the 64-QAM type, each code word MCO is formed of two words XI and XQ each of three bit. The confidence word CF2 breaks down into a confidence CF2(XI) associated with the bits of the word XI and a confidence CF2(XQ) associated with the bits of the word XQ.

In fact, in the present case each confidence CF2(XI) (respectively CF2(XQ)) is equal to the product of the initial confidence word CFB times a confidence CF1(XI) (respectively CF1(XQ)) derived on the basis of a parameter law by the parametrized P. More precisely, these confidence words CF1(XI) and CF1(XQ) are derived from the two digital input words I and Q in derivation means MLB here comprising a hard-wired circuit formed basically using a multiplier and an adder. This hard-wired circuit MLB implements a threshold affine law of the type:

$CF1(XI)=aI+b$ if $SIinf \leq CF1(XI) \leq SIsup$ $CF1(XI)=0$ if $CF1(XI) \leq SIinf$ $CF1(XI)=1$ if $CF1(XI)>SIsup$ $CF1(XQ)=aQ+b$ if $SQinf \leq CF1(XQ) \leq SQsup$ $CF1(XQ)=0$ if $CF1(XQ)<SQinf$ $CF1(XQ)=1$ if $CF1(XQ)>SQsup$ This threshold affine law may be identical for both input variables I or Q or may be different. Be that as it may, this or these threshold affine laws can be parametrized.

In a simple embodiment, each of the data a, b and each of the thresholds SIinf, SIsup, SQinf, SQsup may be defined on the basis of the same parameter P, for example, by fractions of P. Some at least of the data a, b and/or some at least of the aforementioned thresholds can also be defined independently on the basis of different parameters and/or different laws.

The bits XIj ($1 \leq j \leq 3$ under 64QAM) of the word XI and the bits XQj ($1 \leq 3$ under 64QAM) of the word XQ are determined moreover in a discriminator DSM with the aid of predefined and normalized thresholds SSIj and SSQj, as follows:

$XIj=1$ if $I-SSIj \geq 0$;

$XIj=0$ if $I-SSI<0$ $XQj=1$ if $Q-SSQj \geq 0$;

$XQj=0$ if $Q-SSQj<0$

The code words MCO are then delivered into a subsequent decoding block comprising, in the present case, a deinterlacer DSL followed by a decompression device DPN linked to a convolutional decoder DVT, in this instance a Viterbi decoder.

The convolutional Viterbi decoder DVT receives the deinterlaced and decompressed bit train (that is to say the one in which bits with arbitrary values have deliberately been added), as well as the various confidence words CF2(XI) and CF2(XQ). It should be noted here that, in practice, null confidence words will be assigned with respect to the bits arbitrarily added after the decompressing operation.

The base train MCD1 formed by the various base words MCD1, which emanate from the code words MCO, and which is input to the decoder DVT, is decoded to form decoded words MCD2 constituting a decoded train. The decoded train will be delivered to a Reed-Solomon decoder RS so as to continue the channel decoding processing. Moreover, these decoded words MCD2 are re-encoded in a convolutional Viterbi coder EVT, identical to the coder of the transmitter, so as to deliver a train of bits formed of re-encoded words MEC.

The convolutional or Viterbi decoder is likewise a conventional decoder which has been described in numerous publications. In brief, such a decoder implements a Viterbi algorithm finding the maximum likelihood route in a trellis graph representing the various possible successive states of the corresponding coder. More precisely, when two routes converge at the same node of the trellis, their likelihood prior to this node makes it possible alone to choose between them. Therefore, at each instant it is sufficient to retain just one of the routes which converge at each of the nodes. After a certain time, a single route remains. It is chosen with maximum likelihood and indicates the optimal decoded symbol. The likelihood of each route is bound to the confidence criteria of the symbols input to the decoder.

The bit train MCD1 available at the input of the Viterbi decoder DVT and the train of bits MEC available at the output of the Viterbi coder EVT are then compared in comparison means or comparator CMP so as to determine any erroneous bits. Of course, to detect the erroneous bits between the re-encoded words MEC and the corresponding base words MCD1, delay means are, for example, arranged between the input of the decoder DVT and the comparator CMP so as to store the words MCD1. The comparison means will then compare bit by bit the train MCD1 and MEC and deliver, whenever two different bits are present at the inputs of the comparison means, a detection logic signal CER representative of the presence of an erroneous bit.

The various detection signals CER are delivered to processing means MT having an architecture based upon a microcontroller. The processing means then determine a rate of erroneous bits TEB by counting the number of signals detecting erroneous bits over a predetermined average of bits processed, typically 5000 bits. Moreover, these processing means comprise, in a memory M1, a predetermined set of values of the parameter P making it possible to parametrize the various data a, b and the various thresholds SIinf, SIsup, SQinf, SQsup, of the various laws for deriving the confidence words CF1(XI) and CF1(XQ).

Figure 4:
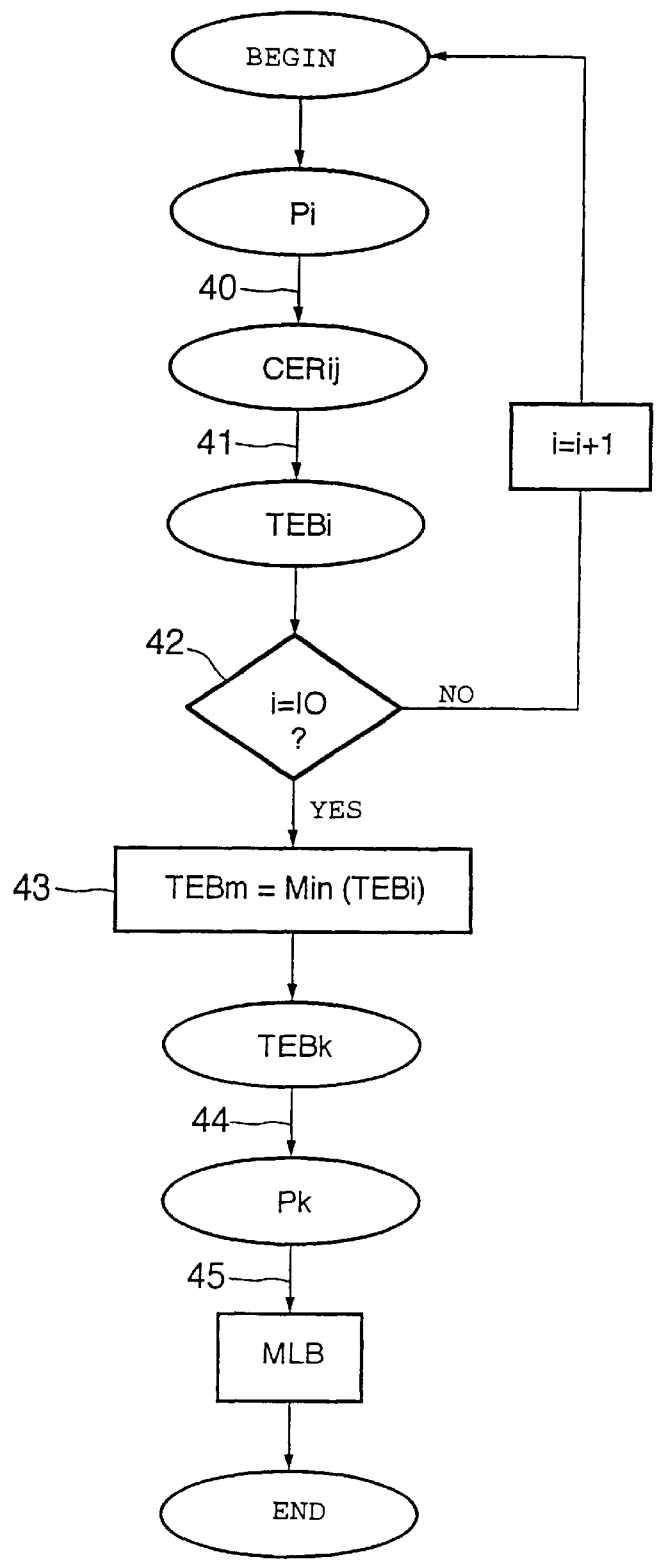
FIG. 4 illustrates very schematically a flowchart for implementing the process according to the invention.

The operation of the device according to the invention will now be described with reference more particularly to FIG. 4. Firstly, the processing means MT deliver one of the values Pi, contained in the memory M1, of the parameter P to a register RG connected to the derivation means MLB. The derivation means MLB, therefore, use this value Pi of the parameter to determine the confidence words CF1(XI) and CF1(XQ). The comparison means deliver (step 40) any signals detecting erroneous bits CERij corresponding to this value of the parameter, and the processing means deduce therefrom (step 41) the rate of erroneous bits TEBi corresponding to the value Pi of the parameter.

The processing means MT then vary the value of the parameter P (step 42), delivering to the register RG the subsequent values of the parameter P, taken from the predetermined set of values stored in the memory M1. The processing means calculate a new rate of erroneous bits for this new value of the parameter and repeat these operations for the parameter values stored in the memory M1.

The processing means then determine (step 43) the minimum rate of erroneous bits TEBm which in this instance is the rate TEBk corresponding to the value Pk of the parameter (step 44). The processing means then deliver the value Pk to the register RG so that, for the remainder of the channel decoding, that is to say for the words I and Q which will be received subsequently, the derivation means MLB derive the confidence words by using the threshold affine law parametrized by the value Pk.

The invention thus makes it possible to slave the law for deriving the confidence words to the rate of erroneous bits. This guarantees a minimum rate of erroneous bits irrespective of the characteristics of the transmission channel. By way of indication, a typical measurement has been performed for a "Rayleigh" type channel modelling with Gaussian noise and with echoes under the following conditions: 64QAM modulation with 2048 carriers, compression rate 2/3, non-hierarchical transmission, guard interval 1/32. Whereas the residual error rate at the output of the Viterbi decoder rises to $2.683 \times 10^{-3}$ for threshold values provided with respect to a Rice/Rayleigh type channel, it is equal to only $2.2254 \times 10^{-3}$ for threshold values which are slaved, according to the invention, to the error rate.

That which is claimed is:

1. A method for decoding a radio frequency transmission channel conveying, by quadrature modulation of at least one carrier, coded digital information, the method comprising the steps of:

receiving a succession of digital input blocks, each comprising a pair of digital input words representative of the coded digital information;

determining a code word and an associated confidence word from each pair of digital input words and based upon at least one mapping law, the at least one mapping law being parametrized by at least one parameter to make possible, for each value of the parameter, determination of the confidence word for each of the two digital input words;

varying a value of the at least one parameter and determining a rate of erroneous bits for each current value of the at least one parameter and for a predetermined number of bits received; and selecting a value of the at least one parameter giving a minimum rate of erroneous bits from among current values and assigning the selected value to the at least one parameter for a remainder of channel decoding.

2. A method according to claim 1, wherein the coded digital words are convolutionally coded; and further comprising the steps of:

convolutionally decoding a train of bits formed by base words gleaned from the code words to obtain a train of bits formed of decoded words;

convolutionally re-encoding the decoded words; and comparing a train of re-encoded words and a train of corresponding base words.

3. A method according to claim 1, further comprising the step of deriving a predetermined set of values of the at least one parameter; and wherein the step of varying comprises varying the value of the at least one parameter by successively assigning thereto all values of the predetermined set of values.

4. A method according to claim 1, wherein the mapping law comprises a parametric threshold affine law from which is derived, for each pair of input words, a first confidence word multiplied by an initial confidence word associated with the pair of input words to obtain the confidence word associated with the code word.

5. A method for decoding a radio frequency transmission channel conveying, by quadrature modulation of at least one carrier, coded digital information, the method comprising the steps of:
   receiving a succession of digital input blocks, each comprising a pair of digital input words representative of the coded digital information;
   determining a code word and an associated confidence word from each pair of digital input words and based upon at least one mapping law, the at least one mapping law being parametrized by at least one parameter to make possible, for each value of the parameter, determination of the confidence word for each of the two digital input words;
   varying a value of the at least one parameter and determining a rate of erroneous bits for each current value of the at least one parameter and for a predetermined number of bits received; and
   assigning a value for the at least one parameter giving a predetermined rate of erroneous bits from among current values for a remainder of channel decoding.

6. A method according to claim 5, wherein the predetermined rate represents a minimum rate of erroneous bits.

7. A method according to claim 5, wherein the coded digital words are convolutionally coded; and further comprising the steps of:
   convolutionally decoding a train of bits formed by base words gleaned from the code words to obtain a train of bits formed of decoded words;
   convolutionally re-encoding the decoded words; and
   comparing a train of re-encoded words and a train of corresponding base words.

8. A method according to claim 5, further comprising the step of deriving a predetermined set of values of the at least one parameter; and wherein the step of varying comprises varying the value of the at least one parameter by successively assigning thereto all values of the predetermined set of values.

9. A method according to claim 5, wherein the mapping law comprises a parametric threshold affine law from which is derived, for each pair of input words, a first confidence word multiplied by an initial confidence word associated with the pair of input words to obtain the confidence word associated with the code word.

10. A device for decoding a radio frequency transmission channel conveying, by quadrature modulation of at least one carrier, coded digital information, comprising:
    an input for receiving a succession of digital input blocks, each comprising a pair of digital input words representative of the coded digital information transmitted;
    a preprocessing block for determining, on the basis of each pair of digital input words and a mapping law, a code word and a confidence word, said preprocessing block comprising
    a discriminator for delivering, for each of the pair of digital input words, the code word, and
    a derivation block comprising a parametrizing input for receiving at least one variable parameter for establishing at least one parametric mapping law, said derivation block for delivering as a function of the parametric mapping law, and for each of the two digital input words, the corresponding confidence word;
    a detection block connected to an output of the preprocessing block for detecting erroneous bits; and
    a processing block connected between an output of the detection block and the input of the derivation block, for varying the at least one parameter delivered to the derivation block, and for determining based upon a number of erroneous bits detected for a current value of the parameter and for a predetermined number of bits received a rate of erroneous bits corresponding to the current value of the at least one parameter;
    said processing block for selecting a value of the at least one parameter giving a predetermined rate of erroneous bits from among current values, and for delivering to the derivation block the selected current value for the remainder of channel decoding.

11. A device according to claim 10, wherein the predetermined rate of erroneous bits is a minimum rate of erroneous bits.

12. A device according to claim 10, wherein the coded digital information is convolutionally coded; and wherein said detection block comprises:
    a convolutional decoder having an input connected to an output of the preprocessing block;
    a convolutional coder having an input connected to an output of the convolutional decoder; and
    a comparator having inputs respectively connected to the input of the convolutional decoder and to the output of the convolutional coder, the output of the comparator being connected to the input of the processing means.

13. A device according to claim 10, further comprising a memory for storing a predetermined set of values of the at least one parameter; and wherein the processing block successively reads all values of the predetermined set to establish successively corresponding rates of erroneous bits and stores the selected current value.

14. A device according to claim 10, wherein the parametric mapping law comprises a parametric threshold affine law.

15. A device according to claim 10, wherein said derivation block comprises a hard-wired circuit comprising a multiplier and an adder.

16. A device according to claim 14, wherein said derivation block comprises:
    a hard-wired circuit implementing the parametric affine law and delivering first digital confidence words; and
    a multiplier for multiplying the first digital confidence word by an initial confidence word contained in each digital input block to form the confidence word for each pair of digital input words.

17. A device for decoding a radio frequency transmission channel conveying, by quadrature modulation of at least one carrier, coded digital information, comprising:
    an input for receiving a succession of digital input blocks, each comprising a pair of digital input words representative of the coded digital information transmitted;
    a preprocessing block for determining, on the basis of each pair of digital input words and a mapping law, a code word and a confidence word, said preprocessing block comprising
    a discriminator for delivering, for each of the pair of digital input words, the code word, and
    a derivation block comprising a parametrizing input for receiving at least one variable parameter for establishing at least one parametric mapping law, said derivation block for delivering as a function of the parametric mapping law, and for each of the two digital input words, the corresponding confidence word;

a detection block connected to an output of the preprocessing block for detecting erroneous bits;

a memory for storing a predetermined set of values of the at least one parameter; and a processing block connected between an output of the detection block and the input of the derivation block, for varying the at least one parameter delivered to the derivation block by successively reading all values of the predetermined set from said memory, and for determining based upon a number of erroneous bits detected for a current value of the parameter and for a predetermined number of bits received a rate of erroneous bits corresponding to the current value of the at least one parameter;

said processing block for selecting a value of the at least one parameter giving a predetermined rate of erroneous bits from among current values, and for delivering to the derivation block the selected current value for the remainder of channel decoding.

18. A device according to claim 17, wherein the predetermined rate of erroneous bits is a minimum rate of erroneous bits.

19. A device according to claim 17, wherein the coded digital information is convolutionally coded; and wherein said detection block comprises:

a convolutional decoder having an input connected to an output of the preprocessing block;

a convolutional coder having an input connected to an output of the convolutional decoder; and a comparator having inputs respectively connected to the input of the convolutional decoder and to the output of the convolutional coder, the output of the comparator being connected to the input of the processing means.

20. A device according to claim 17, wherein the parametric mapping law comprises a parametric threshold affine law.

21. A device according to claim 17, wherein said derivation block comprises a hard-wired circuit comprising a multiplier and an adder.

22. A device according to claim 17, wherein said derivation block comprises:

a hard-wired circuit implementing the parametric affine law and delivering first digital confidence words; and a multiplier for multiplying the first digital confidence word by an initial confidence word contained in each digital input block to form the confidence word for each pair of digital input words.

* * * * *

UNITED STATES PATENT AND TRADEMARK OFFICE
CERTIFICATE OF CORRECTION

PATENT NO. : 6,426,981 B1
DATED : July 30, 2002
INVENTOR(S) : Jacques Galbrun

It is certified that error appears in the above-identified patent and that said Letters Patent is hereby corrected as shown below:

Column 4,
Line 42, delete "DRAWING" insert -- DRAWINGS --

Column 6,
Line 48, delete "$1 \leq 3$" insert -- $1 \leq j \leq 3$ --
Line 55, delete "XIj=0 if I-SSI<0" insert -- XIj=0 if I-SSIj<0 --

Signed and Sealed this

Seventeenth Day of December, 2002

JAMES E. ROGAN
*Director of the United States Patent and Trademark Office*